United States Patent Office 2,701,757
Patented Feb. 8, 1955

2,701,757

PROCESS OF MAKING SYNTHESIS GAS

Earl W. Riblett, Tenafly, N. J., assignor, by mesne assignments, to Texaco Development Corporation, New York, N. Y., a corporation of Delaware No Drawing. Application December 17, 1946, Serial No. 716,887

3 Claims. (Cl. 48—196)

This invention relates to a process and a method of control therefor for the manufacture of gas containing carbon monoxide and hydrogen suitable for charging to a synthesis reaction zone for the production of hydrocarbons, oxygen-containing compounds and the like.

Generally in the preparation of such synthesis gas, it is the practice to feed a carbonaceous material, such as methane, and substantially pure oxygen to a generator, cause the two reactants to react therein, and remove the effluent stream of gas. In such practice, it is desirable to secure an effluent consisting essentially of carbon monoxide and hydrogen in the proportion of 1 mol carbon monoxide to 2 mols of hydrogen. While this objective has been approximated by proportioning the initial feed of the hydrocarbon and oxygen, the effluent stream has been found to contain certain undesirable compounds in appreciable quantities.

For example, under some conditions of operation, appreciable amounts of free carbon have been formed with resultant decrease in conversion, loss of product, deactivation of the catalyst, if one be used, and clogging of the generator. This requires halting of the process, removal of the carbon, and reactivation of the catalyst. Formation of a substantial amount of free carbon also results in the presence of a large proportion of methane in the product gases.

If the proportional feed of hydrocarbon and oxygen be altered to avoid such free carbon formation, it has been found that excessive amounts of carbon dioxide and water are produced, thereby resulting in loss of product.

In overcoming the aforesaid disadvantages, it is an object of this invention to provide a process wherein the reaction products are essentially carbon monoxide and hydrogen, the quantities of undesirable products being kept to a minimum.

A further object of the invention is the provision of a novel control for such a process wherein the correct proportional feeds of the initial reactants can be easily and quickly determined within substantially narrow limits and so maintained to produce a high yield in desirable constituents.

In brief, it has been discovered that despite the high temperatures and pressures involved and the short time the resulting gases are in the generator, the methane content in the effluent exists in a definite relation to the quantities of undesirable products formed such as free carbon, carbon dioxide and water. Accordingly, by using the methane content of the effluent gases as a gauge or control, it has been found possible to accurately control the proportional feed of hydrocarbon and oxygen, or as it may be expressed, the O/C ratio where O represents atomic oxygen and C represents the carbon in the complete feed (fresh feed plus recycle, if any), within relatively fine limits and to an extent to avoid the production of free carbon and excess methane on one hand, and the production of excessive carbon dioxide and water on the other hand. This control by adjustment of the O/C ratio is applicable to any hydrocarbon regardless of whether C represents the carbon content of a carbonaceous solid such as coal, a liquid such as fuel oil, cracked or virgin residues, or a gas such as natural gas. Similarly, O can be considered to represent the atomic oxygen of substantially pure oxygen, an oxygen-enriched gas or air.

While it has been appreciated heretofore that the O/C ratio is critical from the standpoint of avoiding both the production of free carbon and carbon dioxide and water, the correct O/C ratios have been difficult to determine because of the varying characteristics and compositions of the different hydrocarbons used, such as coal, fuel oil and natural gas, and the thought that different types of hydrocarbons and even different types of natural gas, the principal source of methane, would require extensive experiments in each case. Quite to the contrary and with any carbonaceous material, it has been discovered that by operating at an O/C ratio to produce a methane content in the effluent stream of reaction products of about 0.5 to 5 per cent, preferably 2 to 3 mol per cent, a maximum production of desirables such as carbon monoxide and hydrogen is secured with a minimum production of free carbon, carbon dioxide and water. This range appears critical in that when the residual methane content of the effluent stream exceeds about 5 mol per cent, free carbon is produced in an appreciable amount. This has been determined by actual clogging of the generator and in less extreme cases by dense black discoloration of the water used in quenching the effluent stream. Between 2 and 5 mol per cent, there is a readily discernible decrease in the quench water discoloration, the quench water changing from dark black at 5 per cent to substantially clear water at 2 per cent. Below 2 per cent, the quench water is not discolored and there does not appear to be any appreciable carbon formation. On the other hand, if sufficient oxygen is charged so that there is no methane in the effluent stream, a relatively large proportion of the oxygen is apparently consumed in the form of undesirable products such as excess carbon dioxide and water. In addition the reaction temperatures within the generator tend to be excessive. Thus, there appears to be a critical range of methane in the effluent which can be correlated to an optimum production of desirables and the amount of oxygen or the O/C ratio charged to the generator.

As an example of the process of this invention and its method of control, a hydrocarbon such as methane is caused to react with substantially pure oxygen at a temperature in the range of 2000–2800° F. and a pressure in the range of 100–400 pounds per square inch gauge, preferably 200–300 pounds per square inch gauge. The reaction may be conducted in the presence or absence of steam and with or without a catalyst. The reactants are preferably separately preheated to elevated temperatures. The methane may be preheated to at least 800° F. and preferably to about 1200° F., preferably without cracking, and is charged at a rate of about 1000–3000 cubic feet per hour per cubic foot of reaction space. The oxygen is preheated to at least 600° F. and preferably 800° F. or higher and charged to the reaction zone in an approximately correct amount that can be determined within broad limits by the formation of a substantially non-luminous flame in the reaction zone. This amount is usually about 5 to 20 mol per cent in excess of that stoichiometrically required to convert all the carbon in the methane to carbon monoxide.

The resulting reaction products are continuously removed from the reaction zone as an effluent stream consisting essentially of carbon monoxide and hydrogen. The temperature of the effluent stream is reduced as quickly as possible to avoid secondary reactions.

Oxygen of relatively high purity, at least 80 per cent and preferably 95 per cent, is used, thereby eliminating large amounts of nitrogen from the synthesis gas. This materially reduces the heat requirements and also results in a synthesis gas more suited to the subsequent synthesis reaction.

By varying the O/C ratio to maintain a methane content in the effluent stream of from 0.5 to 5 per cent, a maximum production of the desired carbon monoxide and hydrogen with a minimum production of free carbon, carbon dioxide and water is secured. When steam is not added, the O/C ratio with natural gas will approximate 1.0 to 1.25. When steam is added, it is necessary to change the O/C ratio to maintain the desired methane content in the effluent.

When natural gas, having methane as the chief constituent, is used as the carbonaceous material and steam is not added, it has been found desirable to begin the process with an O/C ratio in the range of 1.00 to 1.25. It is then possible to more closely adjust the O/C ratio within this range by observation of the methane content in the effluent, the amount of oxygen charged usually being varied until the desired methane content of 0.5 to 5 mol per cent in the effluent is obtained.

The concentration of oxygen is such that under the aforesaid temperature and pressure conditions in the generator and with preheating of the reactants, the reaction is effected without the necessity of external heating of the reaction zone. By separately preheating the reactants and effecting mixing of the preheated gases within the reaction zone, backfiring in the back lines and preheaters is prevented. Mixing of the reactant gases is accomplished entirely within the reaction zone by introducing separate streams of hydrocarbon and oxygen so that they impinge upon one another within the reaction zone while flowing at a high velocity in the order of about 100 feet per second or in the range of about 30 to 200 feet per second. A small amount of the total oxygen charged may be premixed with the hydrocarbon gas providing the resulting mixture is non-combustible under the prevailing conditions of preheating. It has been found that the higher the preheat, the lower the O/C ratio becomes for a given methane content. Stated otherwise, if a certain O/C ratio is required for a methane content of 2 per cent at relatively low preheat, at a higher preheat, the O/C ratio must be decreased to maintain the same 2 per cent methane content in the effluent.

The actual O/C ratio corresponding to the desired methane content in the effluent of from 0.5 to 5 mol per cent, preferably 2 to 3 mol per cent, will vary in accordance with the type of carbonaceous material being processed, with the amount of steam added, if any, the temperature of the reaction, the pressure under which the reaction takes place and other factors. Regardless of the variance of the O/C ratio as caused by such other factors, if it is maintained to produce the aforesaid methane content in the effluent, the proportion of desirable products will be maintained at a maximum with the undesirable maintained at a minimum.

Obviously, many modifications and variations of the invention as above set forth may be made without departing from the spirit and scope thereof, and therefore only such limitations should be imposed as are indicated in the appended claims.

I claim:

1. The process for generating synthesis gas consisting essentially of carbon monoxide and hydrogen, which comprises separately preheating a hydrocarbon to a temperature of at least about 800° F. and high-purity oxygen to a temperature of at least about 600° F., charging the preheated hydrocarbon and high-purity oxygen directly into a reaction zone free of catalyst, maintained at a temperature in the range of about 2000° to 2800° F. solely by the exothermic reaction of said preheated hydrocarbon and high-purity oxygen and at a pressure in the range of about 100 to 400 pounds per square inch gauge, said hydrocarbon being charged into said reaction zone at a space velocity of at least 1000 cubic feet per hour per cubic foot of reaction space, and regulating the proportions of said streams so that the oxygen is about 5 to 20 mol per cent in excess of that stoichiometrically required to convert all the carbon in said hydrocarbon to carbon monoxide, reacting said hydrocarbon and high-purity oxygen in said reaction zone until the hydrocarbon content of the resultant reaction gases is reduced to the range of about 0.5 to 2 mol per cent of hydrocarbon and thereupon withdrawing from said reaction zone said resultant reaction gases, thereby minimizing the formation of free carbon and obtaining synthesis gas consisting essentially of carbon monoxide and hydrogen.

2. The process of claim 1 wherein said hydrocarbon is natural gas.

3. The process for generating synthesis gas consisting essentially of carbon monoxide and hydrogen, which comprises separately preheating methane to a temperature of at least about 800° F. and high-purity oxygen to a temperature of at least about 600° F., charging separate streams of the preheated methane and high-purity oxygen directly into a reaction zone free of catalyst, maintained at a temperature in the range of about 2000° to 2800° F. solely by the exothermic reaction of said preheated methane and high-purity oxygen and at a pressure in the range of about 100 to 400 pounds per square inch gauge, said methane being charged into said reaction zone at a space velocity in the range of about 1000 to 3000 cubic feet per hour per cubic foot of reaction space, regulating the proportions of said streams so that the oxygen is about 5 to 20 mol per cent in excess of that stoichiometrically required to convert all the carbon in said methane to carbon monoxide, reacting said methane and high-purity oxygen in said reaction zone until the methane content of the resultant reaction gases is reduced to the range of about 0.5 to 2 mol per cent of methane, and thereupon withdrawing from said reaction zone said resultant reaction gases, thereby minimizing the formation of free carbon and obtaining synthesis gas consisting essentially of carbon monoxide and hydrogen.

References Cited in the file of this patent

UNITED STATES PATENTS

| Number | Name | Date |
|---|---|---|
| 1,826,974 | Williams | Oct. 13, 1931 |
| 1,904,441 | Freyermuth et al. | Apr. 18, 1933 |
| 1,915,362 | Hanks et al. | June 27, 1933 |
| 1,921,856 | Weitzel et al. | Aug. 8, 1933 |
| 2,051,363 | Beekley | Aug. 18, 1936 |
| 2,056,911 | Schiller et al. | Oct. 6, 1936 |
| 2,491,518 | Riblett | Dec. 20, 1949 |
| 2,563,460 | Faber | Aug. 7, 1951 |